US010783472B2

(12) United States Patent
Carpenter et al.

(10) Patent No.: US 10,783,472 B2
(45) Date of Patent: Sep. 22, 2020

(54) APPLYING MACHINE LEARNING TO DYNAMICALLY SCALE COMPUTING RESOURCES TO SATISFY A SERVICE LEVEL AGREEMENT (SLA)

(71) Applicant: Dell Products L. P., Round Rock, TX (US)

(72) Inventors: Dónal Carpenter, Wicklow (IE); Mahuya Ghosh, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 15/798,645

(22) Filed: Oct. 31, 2017

(65) Prior Publication Data

US 2019/0130327 A1    May 2, 2019

(51) Int. Cl.
| | | |
|---|---|---|
| *G06Q 10/06* | (2012.01) | |
| *G06Q 50/18* | (2012.01) | |
| *G06F 9/455* | (2018.01) | |
| *H04L 12/24* | (2006.01) | |
| *G06N 20/00* | (2019.01) | |
| *H04L 12/26* | (2006.01) | |
| *H04L 29/08* | (2006.01) | |

(52) U.S. Cl.
CPC ..... *G06Q 10/0635* (2013.01); *G06F 9/45558* (2013.01); *G06N 20/00* (2019.01); *G06Q 50/18* (2013.01); *H04L 41/0806* (2013.01); *H04L 41/5009* (2013.01); *H04L 43/08* (2013.01); *G06F 2009/45595* (2013.01); *H04L 43/16* (2013.01); *H04L 67/10* (2013.01)

(58) Field of Classification Search
CPC .......................... G06Q 10/0635; G06Q 50/18
USPC ........................................................ 705/7.28
See application file for complete search history.

(56) References Cited

U.S. PATENT DOCUMENTS

| | | | |
|---|---|---|---|
| 9,946,577 B1 * | 4/2018 | Stafford | ................. H04L 67/10 |
| 10,002,016 B2 * | 6/2018 | Riel | .................... G06F 9/45558 |
| 10,162,678 B1 * | 12/2018 | Stafford | ............ H04L 29/08135 |
| 10,325,343 B1 * | 6/2019 | Zhao | ............... G06F 11/3452 |
| 10,503,553 B1 * | 12/2019 | Ashok | ................... G06F 9/5011 |
| 2012/0167108 A1 * | 6/2012 | Bowers | ................ G06F 9/5072 |
| | | | 718/103 |
| 2013/0060933 A1 * | 3/2013 | Tung | ................... G06F 11/3495 |
| | | | 709/224 |
| 2016/0283274 A1 * | 9/2016 | Kochunni | ............ G06F 9/5016 |

(Continued)

*Primary Examiner* — Folashade Anderson
(74) *Attorney, Agent, or Firm* — Campbell Stephenson LLP; Shiv S. Naimpally

(57) ABSTRACT

Some examples include a service to receive a job request that includes a job, a priority of the job, and a callback that identifies an application to execute the job. The application may be hosted by a particular virtual machine of a plurality of virtual machines being executed in a cloud hosting facility. The service may add the job request to a queue and determine, using a machine learning algorithm, a risk score associated with the job. Based at least in part on the risk score, the service may send a provisioning request to the cloud hosting facility to provision one or more additional virtual machines. After determining that the application has completed executing the job, the service may send a de-provisioning request to the cloud hosting facility to de-provision at least one virtual machine of the one or more additional virtual machines.

20 Claims, 8 Drawing Sheets

(56) References Cited

U.S. PATENT DOCUMENTS

2018/0181390 A1* 6/2018 Lepcha ................ G06F 9/5061
2019/0056969 A1* 2/2019 Khandros ........... G06F 11/3051

* cited by examiner

APPLYING MACHINE LEARNING TO DYNAMICALLY SCALE COMPUTING RESOURCES TO SATISFY A SERVICE LEVEL AGREEMENT (SLA)

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When processing large volumes of offline data and online data, servers may be unable to keep up with the large volumes if the processing times become significantly greater than the job queue or the incoming data rate, leading to degradation of performance, production outages, and the like. For a company that is providing data processing and cloud hosting services to clients, such performance degradation and outages can lead to the company failing to meet a client's service level agreement, lost revenue, and adverse legal implications.

SUMMARY

This Summary provides a simplified form of concepts that are further described below in the Detailed Description. This Summary is not intended to identify key or essential features and should therefore not be used for determining or limiting the scope of the claimed subject matter.

Some examples include a service to receive a job request that includes a job, a priority of the job, and a callback that identifies an application to execute the job. The application may be hosted by a particular virtual machine of a plurality of virtual machines being executed in a cloud hosting facility. The service may add the job request to a queue and determine, using a machine learning algorithm, a risk score associated with the job. For example, the risk score may identify a probability that completing the job will fall outside the constraints specified in a service level agreement (SLA). Based at least in part on the risk score, the service may send a provisioning request to the cloud hosting facility to provision one or more additional virtual machines. After determining that the application has completed executing the job, the service may send a de-provisioning request to the cloud hosting facility to de-provision at least one virtual machine of the one or more additional virtual machines.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
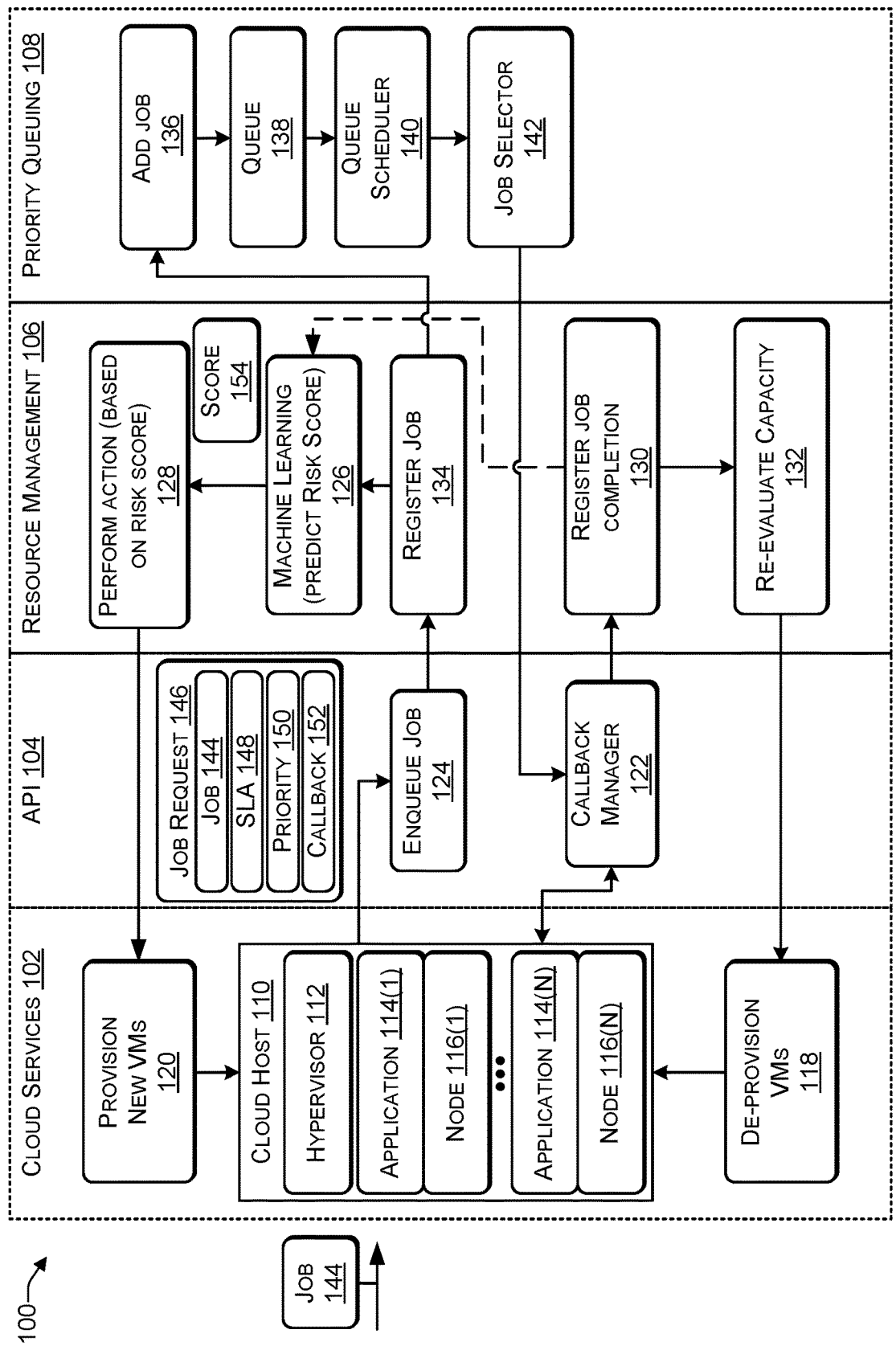
FIG. 1 is a block diagram illustrating an architecture of a cloud hosting facility according to some examples.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk or solid state drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide a service to predictively auto-scale cloud applications and intelligently prioritize execution order based on an SLA violation risk, a legal risk, and a revenue loss risk. A job queue may be used to queue incoming client jobs for execution. Before each job is placed in the queue, each job may be analyzed using machine learning (e.g., ordinary least squares or similar) to determine a risk score that takes into account the probability of an event occurring (e.g., violation of SLA) and the impact of the event if the event occurs. The jobs in the queue may be sorted and prioritized based on the risk score. After the machine learning algorithm determines the risk score, the service may automatically send a request to the cloud hosting facility to provision additional computing resources (e.g., additional virtual machines (VMs) and the like) to mitigate the risk of violating the SLA. After each job is completed, a determination may be made, based on factors, such as, for example, the queue size, the priority of queue in the work, the size of the jobs in the queue, the likelihood of additional jobs coming in, and the like, whether a portion of the currently allocated computing resources can be de-provisioned. For example, when a high priority job arrives that, if not completed within a predetermined period of time, may result in a violation of the SLA and revenue loss to the service provider, additional computing resources may be allocated. After the high priority job has been processed, if the remaining jobs in the queue are low priority jobs, then the additional computing resources that were allocated for the high priority job may be de-allocated (e.g., de-provisioned).

A service-level agreement (SLA) is an agreement between a service provider and a client. The SLA specifies particular aspects of the service (e.g., quality, availability, responsibilities, acceptable response times, and the like) that the service provider is to provide the client.

A priority queue is a data structure is a queue in which queued element has an associated priority and the order of the elements in the queue is determined based on the priority. For example, in the queue, a high priority element is placed ahead of a low priority element. The priority queue may be a single structure, or distributed across multiple instances to provide high availability clustering. In some cases, an enterprise solution may require a number of priority queues to be interlaced or interconnected to enable the priority queues to adapt to complex scenarios.

A cloud hosting facility may be a cloud facility as provided by, for example, Microsoft® Azure®, or Amazon® Web Services (AWS). The cloud hosting facility may provide three functions: (1) provide VMs and keep them running smoothly, e.g., without any interruption, (2) provision new VMs and deploy a specified application to the new VMs, and (3) de-provision VMs to reduce capacity and cost. The cloud hosting facility itself may not be aware of callback requests, create requests or have any business specific knowledge or functionality.

A software application is capable of executing business features associated with the purpose of the software application. For example, a payroll application executes the business features of managing a payroll. There may be multiple instances of the software application executing on multiple nodes (e.g., hosted by multiple VMs). Individual nodes of the multiple nodes may be unaware of the other nodes and each individual node may be hosted by a VM of the cloud hosting facility. The application may create a job, receive job requests, and execute a callback for the job.

A service provider (e.g., Dell®) provides a service, that includes an application programming interface (API), a machine learning component, and a priority queue. The service triggers the callback associated with a job and initiates requests to a cloud hosting facility (e.g., Azure®, AWS, or the like) to provision/de-provision additional computing resources, such as VMs.

Auto provisioning/auto scaling is the ability of a cloud infrastructure to automatically (e.g., without human interaction) add additional resources (e.g., virtual machines (VMs)) when a workload is greater than normal and to automatically reduce (e.g., de-provision) resources when the workload returns normal or less than normal.

FIG. 1 is a block diagram illustrating an architecture 100 of a cloud hosting facility according to some examples. The architecture 100 includes the following components: cloud services 102, cloud-enabled applications 114, an application programming interface (API) 104, a resource management component 106, and a priority queueing component 108. The cloud services 102 may be provided by a cloud host, such as, for example, Microsoft® Azure® or Amazon® Web Services (AWS). A service provider, such as Dell®, may provide the services 104, 106, and 108. A client may make use of the applications 114 using a service level agreement (SLA) that specifies various services and operational metrics for the services. The SLA may also specify monetary penalties, legal penalties, or both if the operational metrics are not met. For example, if the client sends a service request and the request is not processed within a particular period of time specified in the SLA, then the SLA may specify that the owner of the applications 114 is to pay the client a monetary penalty, resulting in revenue loss for the application owner. The systems and techniques described herein use machine learning to scale the cloud services 102 to avoid violating the SLA and avoid incurring monetary penalties or legal penalties.

The cloud services component 102 may include a cloud host 110, a module to de-provision virtual machines (VMs) 118, and a module to provision new VMs 120. The cloud host 110 may include a hypervisor 112 to monitor multiple VMs, and multiple software applications 114(1) to 114(N) (where N>0) executing on multiple nodes 116(1) to 116(N). For example, each of the nodes 116 may be a hardware node (e.g., server), or a VM. The software applications 114 may provide various software functions and may perform (e.g., execute) jobs.

The API 104 may include an enqueue job module 124 and a callback manager 122. The enqueue job module 124 may add an incoming job to a priority queue. Each job may have an associated application. For example, a payroll job may be executed by a payroll application, an accounting job may be executed by an account application, an ecommerce job may be executed by an ecommerce application, an inventory job may be executed by an inventory application, and so on. When a job reaches the head of the priority queue and is selected for execution, the callback manager 122 may call the application associated with the job to execute the job.

The risk management component 106 may be used to manage the risk associated with each job. The risk management component 106 may include a machine learning component 126 to estimate a risk score 154 and perform a set of actions 128 (e.g., based on the risk score). For example, a determination may be made whether the risk score 154 satisfies a system determined threshold. The resource management component 106 may include a module to register a job completion 130 and a module to re-evaluate capacity 132 of the cloud host 110 in light of the current work load (e.g., current jobs in the queue). The re-evaluate capacity module may determine whether to de-provision VMs. For example, the risk management component 106 may determine the risk score 154 for each new job that is received that takes into account the priority that a client assigned the job, the current status of the queue, and any additional factors. The current status of the queue may include the number of jobs currently in the queue, a priority of the recently new job relative to the priority of jobs currently in the queue, the estimated amount of work associated with the jobs in the queue, the number of current VMs currently provisioned, the status of the currently provisioned VMs (e.g., are all currently provisioned VMs busy or are some VMs idle), and the like. The additional factors may include predicting a possibility of higher priority items coming based on historical information. For example, a particular client may run a payroll job on a particular day each month, a particular client may run sales on a particular day of the year (e.g., Black Friday, Memorial Day, or other particular day) resulting in a large number of ecommerce jobs on that particular day, or a particular client in a particular time zone may send a job at the end of each day at a particular time. The risk score 154 may be determined using a machine learning algorithm, such as ordinary least squares, linear least squares, linear regression, logistic regression, polynomial regression, stepwise regression, ridge regression, lasso regression, elastic net regression or another similar regression algorithm.

The risk score 154 may be a weighted score determined based on (1) the probability of violating an SLA between a client that sent the new job and the cloud hosted application, (2) the probability of revenue loss (e.g., SLA specifies a payment to the client if an SLA violation occurs), and (3) the probability of adverse legal ramifications (e.g., breach of contract due to an SLA violation). The risk score 154 may take into account a priority level (e.g., low, medium, high) that the client assigned the job. Thus, the risk score 154 may take into consideration the probability that revenue loss, an SLA violation, or legal risk may occur and the impact to the client if it does occur. The risk score 154 may be used to determine when to provision additional resources, such as additional VMs. For example, if failing to execute a new job within a particular period of time is predicted to result in a violation of an SLA and revenue loss as well as a major adverse impact to the client, then additional VMs may be allocated. As another example, if failing to execute a new job within a particular period of time is not predicted to result in a violation of an SLA and the job has a low priority indicating little or no impact to the client, then additional VMs may not be allocated or a relatively small number of additional VMs may be allocated.

The priority queueing component 108 may perform various queue-related functions, including adding a job 136 to a queue 138. A queue scheduler 140 may determine an execution order of jobs based at least in part on the priority associated with a job. For example, the queue scheduler 140 may prioritize jobs in the queue 138 by placing high priority jobs ahead of medium priority jobs and medium priority jobs ahead of low priority jobs. A job selector 142 may select a job after the job reaches a head of the queue 138.

A client may send a job 144 for execution to the cloud services 102. The job 144 may be sent for processing in near real-time or may be sent for offline (e.g., batch) processing. Typically, a job to be processed in near real-time may have a higher priority than a batch job. Typically, a batch job may be processed when the queue does not include higher priority jobs, such as real-time jobs. The cloud host 110 may create a job request 146 that includes the job 144, data indicating an SLA 148 associated with the client, a priority 150 that the client has indicated for the job 144, and a callback 152 indicating how the application 114 is to be called to execute the job 144 when the job 144 reaches the head of the queue 138. The cloud host 110 may send the job request 146 to the enqueue job module 124. The priority 150 may be defined in any number of ways to suit the client and the cloud hosting provider. For example, the priority 150 may be one of two values (high or low), one of three values (high, medium, low), one of a value between 1 and 10 (with 1 being a lowest priority, 10 being a highest priority, and a higher number having a higher priority than a lower number), and so on.

The enqueue job module 124 may send the job request 146 to the register the job module 134, where two actions may occur substantially simultaneously. First, the machine learning algorithm 126 may be used to estimate the risk score 154, and one or more actions may be performed based on the risk score 154. For example, the action that is performed may be based on a numerical range into which the risk score 154 falls. To illustrate, assume the risk score is a percentage between 0 and 99 that indicates a likelihood of the SLA being violated, revenue loss being incurred, or a legal risk being incurred. If the risk score is 30% or below, then no action may be taken. If the risk score is between 31% and 50%, an administrator may be notified. If the risk score is between 51% and 70%, an automated script may be performed (e.g., the script may allocate additional non-VM resources). If the risk score is between 71% and 99%, additional VMs may be allocated. Thus, if a determination is made that the risk score 154 falls within a particular range of values, the provision new VMs module 120 may be called to provision additional VMs. Second, while the risk score 154 is being determined, the job request 146 may be sent to the add job module 136 to add the job request 146 to the queue 138.

After the job request 146 is added to the queue 138, the queue scheduler 140 may re-order at least a portion of the jobs in the queue 138 based on a priority of each job in the queue 138. For example, jobs with a higher priority may be placed ahead of a job with a lower priority. When a queued job reaches the head of the queue 138 and the callback manager 122 indicates that a job that was being executed by a node 116 of the cloud application 114 has been completed, the job selector may select the job that is at the head of the queue 138 and send the job for execution to the callback manager 122.

The callback manager 122 may use the callback 152 associated with the job to call the one of the applications 114 being executed by one or more of the nodes 116 to execute the job selected from the head of the queue 138 by the job selector 142. For example, when the job selector 142 selects the job 144 from the queue 138, the callback manager 122 may use the callback 152 to execute the job 144 using the appropriate one of the applications 114 hosted by one or more of the nodes 116.

After one of the applications 114 has completed executing a job (e.g., the job 144), the application may send a message to the callback manager 122 indicating that the job has been completed. The callback manager 122 may instruct the job completion module 130 to mark the job as completed and to use the re-evaluate capacity module 132 to determine whether to de-provision one or more VMs 132. For example, if P number of VMs (where P>0) were provisioned when the job 144 was enqueued, then if the jobs currently in the queue 138 are determined unlikely to use the P VMs, then the P VMs may be decommissioned. If the re-evaluate capacity module 132 determines to de-provision a portion of the VMs, then the de-provision VMs module 118 may be instructed to de-provision a particular number of VMs.

The register job completion module 130 may provide data about the completed job to the machine learning algorithm 126 to enable the machine learning algorithm 126 to learn and incrementally improve the algorithm's predictive abilities. For example, the data associated with the completed job that may be provided to the machine learning algorithm 126 may include the application associated with the job, the priority of the job, a size of the job (e.g., a size of the data to be processed, a number of data elements to be processed, or the like), how many VMs were used to process the job, how much time it took to complete the job, and other job-related data.

Each client may send a job, such as the job 144, using a protocol such as, for example, Hypertext Transfer Protocol (HTTP) or Advanced Message Queueing Protocol (AMQP), to transmit a request to the cloud API 104. The job 144 may include (1) information associated with the client's SLA (e.g., the time in seconds that is allowed for the job to be processed before the SLA is breached), a (2) priority of the job 144 (e.g., a scalar value given by the client or by the application to the job), and (3) callback information. The application or the client may determine the priority based on criteria such as, for example, legal implications of the job not being completed within a particular period of time, fines from the client's customers if the job is not completed within a particular period of time, and revenue impact to the client if the job is not completed within a particular period of time. The callback information includes an instruction to cause an application 114 to execute the job 144. The callback information may include an HTTP callback with a uniform resource identifier (URI), one or more headers, and possibly a body. In some cases, the callback may be an asynchronous callback that may or may not use HTTP.

The machine learning algorithm 126 learns from past data and determines a threshold of the queue and incoming jobs beyond which there may be revenue impact (e.g., due to violating the SLA). If the queue size approaches or exceeds the threshold, the machine learning algorithm 126 may auto-provision additional VMs to process the jobs in the queue 138. The machine learning algorithm 126 determines the break-point threshold by determining the risk score 154 for the job 144 based on considering the number of jobs currently in the queue 138, the number of currently provisioned VMs, a predicted risk of higher priority items appearing in the queue before execution of the job request 144 is starter the total effort associated with processing jobs currently in the queue 138, other information, or any combination thereof. The machine learning 126 may use one or more machine learning algorithms depending on the type of the requests. For example, if the job 14 predominantly batch orientated one particular machine learning algorithm may be used, whereas if the job 144 is predominantly real-time processing then another particular machine learning algorithm may be used.

Once a risk score 154 is calculated, a number of proactive steps can be configured based on which risk score range the risk score 154 falls within. For example, depending on the risk score range, no further action may be taken, a system administrator may be notified, an automated procedure or script may be executed, or additional VMs may be allocated.

The job request 146 may be added to the queue 138 for scheduling. In addition to queue prioritization, the queue scheduler 140 may also perform queue optimization. For example, if a new job is received that is predicted to be outside of (e.g., violate) the SLA, the other jobs in the queue may be analyzed to determine if the new job can be moved up in the queue without violating the SLAs of the other jobs in the queue.

After the job request 146 reaches the head of the queue 138, the job request 146 may be removed from the queue 138 and the callback 152 may be invoked to initiate execution of the job 144 by one or more of the applications 114. When execution of the job 144 is completed, the resource management 106 may capture the environment state and the time taken to execute the job 144 and feed this back into the machine learning 126 to increase the amount of training data and to enable the machine learning 126 to more accurately estimate the risk score 154 for future job requests. For example, the environment state may include the priority 10 of the job 144, number of currently allocated VMs, number of occupied VMs, number of available VMs, day of year, initial place of the job 144 in the queue 138, the total effort to execute jobs ahead of the job 144 in the queue 138, and other information from the environment or supplied in the job request 146.

A system administrator may define a score based on prioritization logic (Pc) initially, when creating a client profile for each client based on the parameters P1, P2, and P3. P1=the system 100 may give precedence to client jobs where the SLA is stringent, e.g., 1=High, 2=Medium, 3=Low. In other words, for each client, the administrator may manually enter the value of P1 based on SLAs defined for the client. P2=the system 100 may give precedence to jobs with which the cloud hosting provider has legal liabilities due to a delay in sending the processed data, e.g., 1=High, 2=Medium, 3=Low. In other words, for each client, the administrator may enter the value of P2 based on legal liabilities for the cloud hosting provider to the client due to a delay in processing the job. P3=the system 100 may give precedence to client jobs where the revenue impact is higher, e.g., the system administrator scores each of the clients based on the volume of orders each client has made in a particular time interval (e.g., the past 6 months), e.g., 1=High, 2=Medium, 3=Low. Pc=ascending order of each customer's jobs in queue where Function (P1, P2, P3), e.g., the queue is arranged in ascending order of customer jobs using revenue impact, SLA and legal liabilities, based on the score.

Thus, a client may send a job to a cloud-hosted application (e.g., one of the applications 114) for execution. The services 104, 106, 108 may determine a risk score using machine learning (e.g., ordinary least squared) to predict the probability (e.g., risk) that revenue loss may occur if the job is not executed within a particular period of time, the probability of an SLA violation, the probability that adverse legal issues may occur, the probability of another potential consequence, or any combination thereof. The risk score may be a weighted score that takes into account one or more risks. For example, the risk score may reflect the consequences of not performing the job within a particular time (e.g., as specified by the SLA between the client and the service provider of the services 104, 106, 108), resulting in revenue loss to the provider of services 104, 106, 108 because there may be a monetary penalty for violating the SLA. A particular set of actions may be performed based on the score. For example, multiple numeric ranges may be defined and the set of actions that are performed may depend on which numeric range the calculated risk score 154 lands within. One set of actions may include automatically (e.g., without human interaction) provisioning additional VMs to mitigate the risk and enable the job to be completed without violating the SLA. While the risk score is being determined, the job may be added to a priority queue. When the job reaches the head of the queue, the callback associated with the job may be invoked to execute the job using the associated callback application. After execution of the job is complete, the data associated with the job and with completing the job may be fed back to the machine learning algorithm to improve the predictions made by the machine learning algorithm. In addition, the current capacity of the applications 114 and the nodes 116 may be evaluated based on the jobs that are currently in the queue to determine if the currently provisioned capacity significantly exceeds (e.g., greater than a threshold amount) the amount of processing capacity that the current contents of the queue is estimated to use. If the currently provisioned capacity significantly exceeds what is estimated to be used by currently queued jobs, one or more resources, such as VMs, may be automatically deprovisioned. For example, if 1,500 VMs are provisioned and the currently queued jobs are estimated to use no more than 1,000 VMs, then 500 VMs may be deprovisioned. Thus, the computing resources, such as VMs, may be automatically scaled up (e.g., to increase resources), based on the risk assessment that is determined each time a new job is received. The computing resources, such as VMs, may be automatically scaled down (e.g., to reduce resources) after a job has been completed, based on re-evaluating the currently allocated resources against the estimated resource usage of currently queued jobs.

Figure 2:
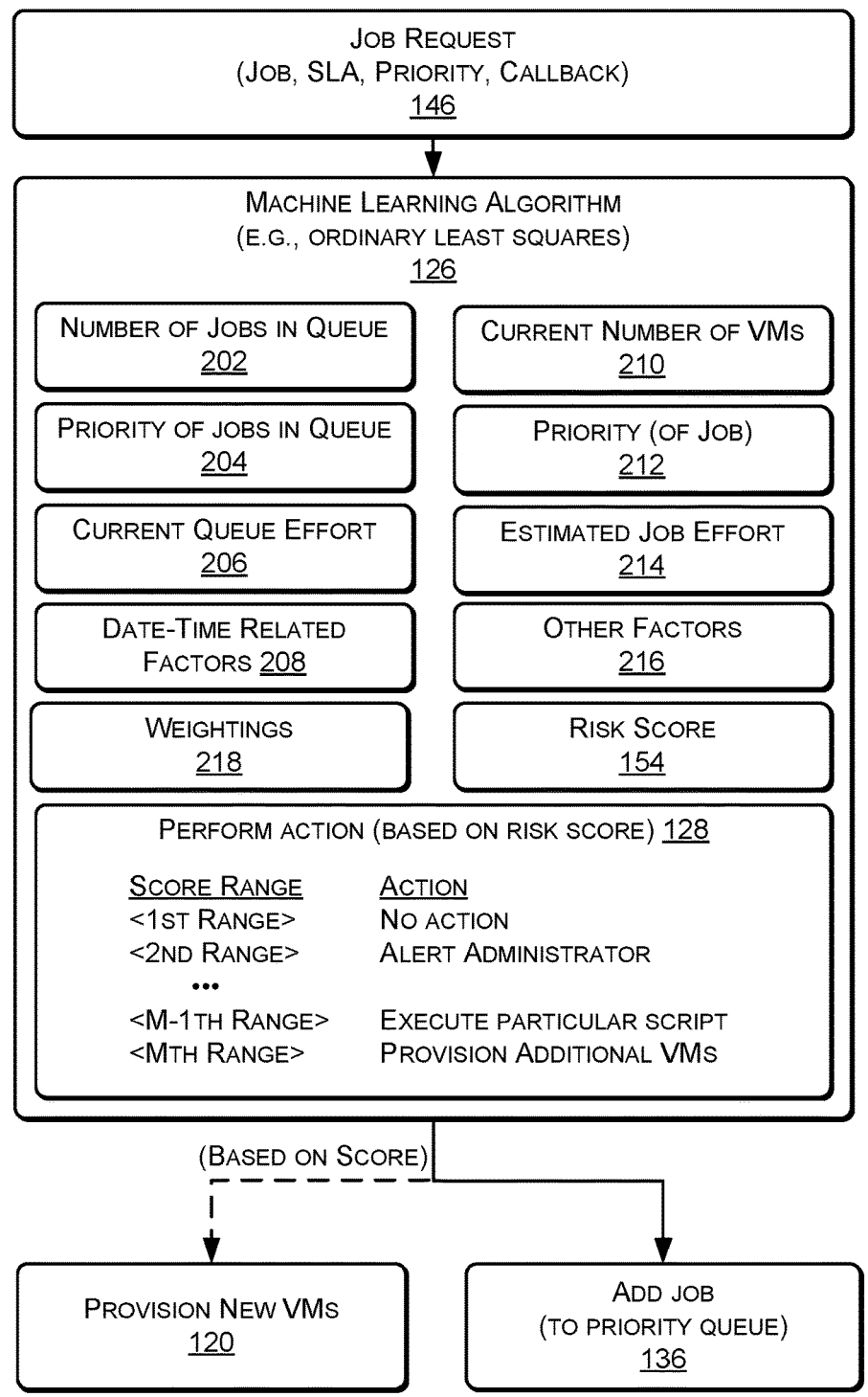
FIG. 2 is a block diagram illustrating an architecture that includes estimating a risk score according to some examples.

FIG. 2 is a block diagram illustrating an architecture 200 that includes estimating a risk score according to some examples. The job request 146 may be provided to the machine learning algorithm 126 to determine the associated risk score 154. To determine the risk score 154, the machine learning algorithm 126 may take into account a number of jobs in the queue 202, a priority of jobs in the queue 204, a current queue effort 206 (e.g., an estimate as to an amount of resources to process the currently queued jobs), data-time related factors 208 (e.g., a particular client sends a particular set of jobs every X number of days at time Y, jobs that occur based on the season, sales occurring on long weekends, quarterly bonus calculations for sales people, and the like), a current number of (e.g., already allocated) VMs 210, a priority 212 of the job request 146, an estimated job effort 214 (e.g., an estimated amount of processing power, including VMs, and time to complete the job request 146), and any other factors 216 (e.g., an importance of the client to the service provider or any other metrics that apply to the current request and may be used as factors when evaluating estimated SLA based on historical data). The various factors 202, 204, 206, 208, 210, 212, 214, and 216 may be weighted based on weightings 218. The weightings 218 may be per client, or per job. For example, the client may specify a particular set of weightings 218 with each job. As another example, one of the applications 114 that received the job may assign a set of weightings 218 to each client based on the client's SLA.

After determining the risk score 154, the perform action 128 module may automatically perform an action based on which range the risk score 154 falls into. For example, there may be M ranges (where M>0). If the risk score 154 is expressed as a percentage, the ranges may be between 0 and 100, for example a first range may be 1% to 30%, a second range may be 31% to 50%, a third range may be 51% to 75%, a fourth range may be 76% to 90%, and a fifth range may be 91% to 99%. The actions may range from taking no action (e.g., for a low score), alerting an administrator (e.g., a higher score), automatically executing a particular script to perform various actions (e.g., to the cloud host 110 of FIG. 1), and automatically provisioning additional VMs. The number of VMs that are provisioned may depend on the estimated job effort 214, the priority 212 of the job 146, the current number of VMs 210, and any of the other factors described above.

After the risk score 154 is determined, in some cases, based on the risk score 154, the provision new VMs module 120 may be instructed to provision additional computing resources, including additional VMs. After the risk score 154 is determined, the job request 146 may be added to the priority queue by the add job module 136.

Figure 3:
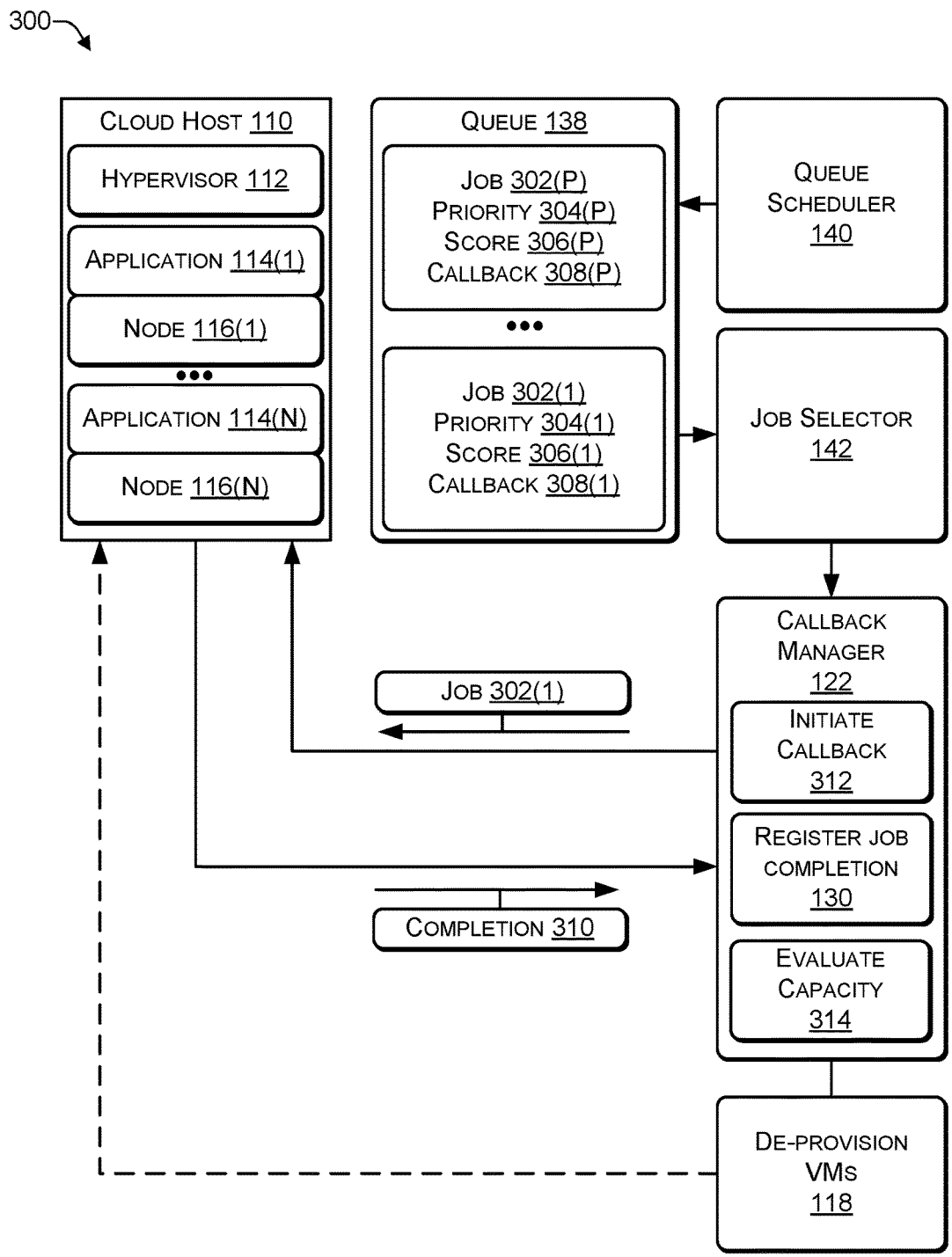
FIG. 3 is a block diagram illustrating an architecture that includes initiating a callback of a job according to some examples.

FIG. 3 is a block diagram illustrating an architecture 300 that includes initiating a callback of a job according to some examples. The architecture 300 provides additional information regarding the callback mechanism.

The queue 138 may include jobs 302(1) to 302(P) (where P>0). Each of the jobs 302 may include a corresponding priority 304, a risk score 306, and a callback 308 (e.g., identifying the application associated with executing the job). Of course, other information may also be associated with each of the jobs 302. The queue scheduler 140 may sort the jobs 302 in the queue 138 according to various factors, including the priority 304, the risk score 306, and an estimated job effort to complete each job. After the job selector 142 is notified that the nodes 116 have capacity within the cloud host 110 to execute a job, e.g., because a job has been completed or because additional VMs have been provisioned, the job selector may select the job that is at the head of the queue, e.g., job 302(1) and send the selected job to the callback manager 122. The callback manager 122 may use the initiate callback module 312 to initiate execution of the job 302(1) by one or more of the nodes 116. For example, assume the job 302(1) is associated with a particular application 114(N), then the initiate callback module 312 may cause an instance of the particular application 114(N) to initiate execution of the job 302(1).

After the job 302(1) has been executed, the application 114 may send or return a completion message 310 indicating that the job 302(1) was completed. The register job completion module 130 may register that the job 302(1) has been completed and the evaluate capacity module 314 may re-evaluate the currently provisioned capacity of the nodes 116 within the cloud host 110 based on the jobs 302 currently in the queue 138. If the evaluate capacity module 314 determines that there is excess capacity, the de-provision VMs module 118 may de-provision a portion of the currently provisioned VMs in the cloud host 110. The total time taken to complete the job and other metrics may be returned to the machine learning module 128 to provide more accurate predictions for future jobs.

Figure 4:
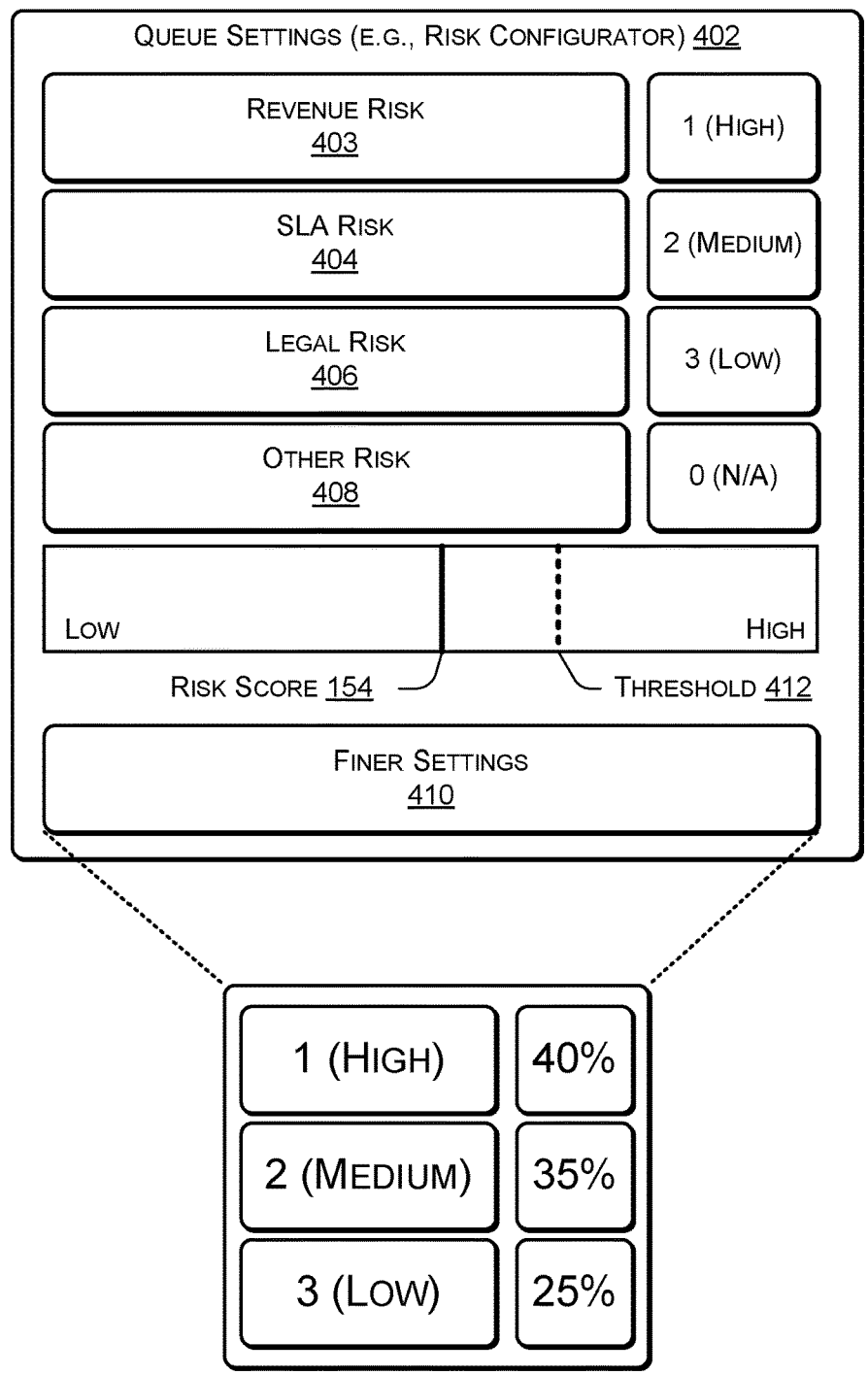
FIG. 4 is a block diagram illustrating a user interface for a queue according to some examples.

FIG. 4 is a block diagram illustrating a user interface (UI) 400 for a queue according to some examples. The UI 400 may include queue settings 402 that can be set by a system administrator to assign a priority or a percentage to each risk. For example, the UI 400 may enable a system administrator to use a numerical priority value (e.g., between 1 and 3, between 1 and 10, between 1 and 100, or the like). To illustrate, the UI 400 may enable the system administrator to assign a numerical priority of 1 (high), 2 (medium), or 3 (low) to each risk, such as, for example, a revenue risk 403, an SLA risk 404, a legal risk 406, and another type of risk 408. Zero ("0") may be used for a risk factor that is not to be taken into consideration. Each numerical priority may have a pre-assigned weight, such as for example, 1=50%, 2=30%, and 3=20%. In addition, the system administrator may be provided with the capacity to override the preassigned weights and set specific weightings for each of the risk factors by selecting a finer settings 410 option. The finer settings 410 may enable the system administrator to define a percentage weighting that is associated with each of the numerical priorities.

The UI 400 may graphically indicate a magnitude of the risk score 154 relative to a system determined threshold 412. For example, the machine learning algorithm 126 may determine the threshold 412 that indicates when additional computing resources, such as VMs, are to be allocated. The threshold 412 may be determined based on analyzing the data associated with jobs over a period of time, taking into account client specific jobs, specific days and dates that a higher volume of jobs is predicted, and the like. When the risk score 154 meets or exceeds the threshold 412, additional computing resources, such as additional VMs, may be provisioned. When the risk score 154 is less than the threshold 412 for more than a particular period of time, then at least a portion of the additional computing resources may de-provisioned.

Figure 5:
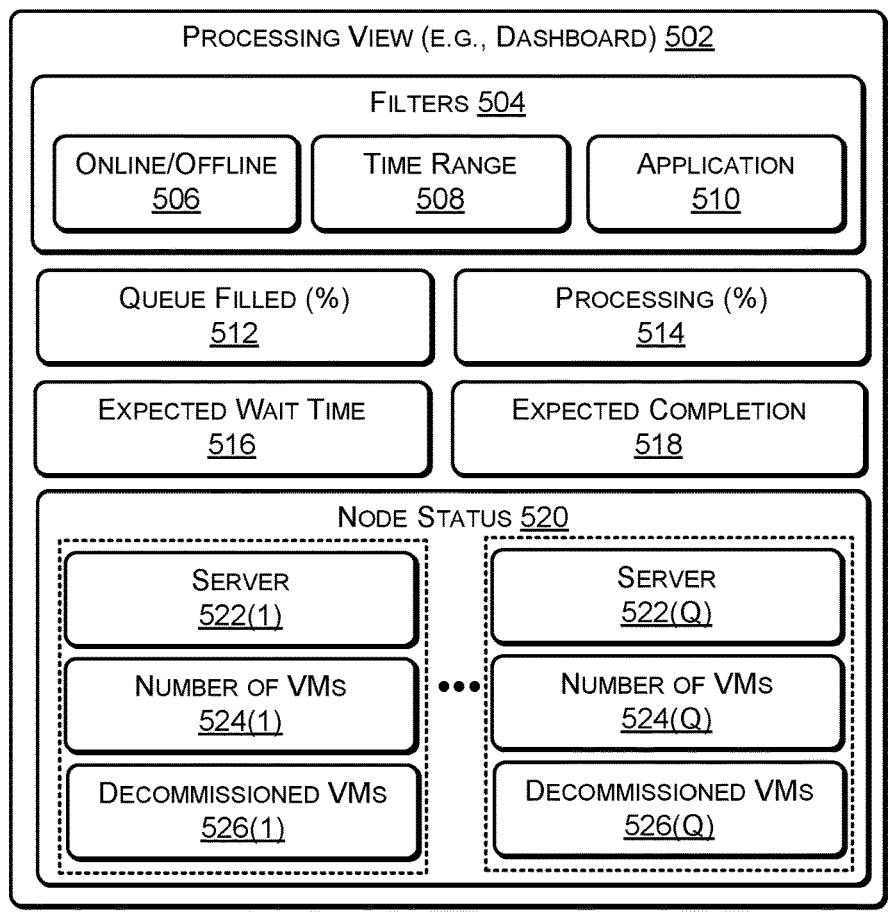
FIG. 5 is a block diagram illustrating a dashboard for a queue according to some examples.

FIG. 5 is a block diagram illustrating a dashboard 500 for a queue according to some examples. The dashboard 500 may include filters 504 that enable the information displayed in the processing view 502 to be filtered according to various criteria, including, for example, whether the jobs being processed are online jobs (e.g., arriving in real-time) or offline jobs (e.g., batch jobs that are run at off-peak times) 506, a time range 508 (e.g., preceding Y hours), and according to a specific application 510.

The processing view 502 may identify what percentage of the queue is currently filled 512 with jobs (e.g., if the queue is 90% full, additional resources may be allocated), what percentage of the current processing 514 resources are being used, an expected wait time 516 for a job in the queue to be processed, and an expected completion time 518. For example, if processing 514 indicates that 90% of the currently provisioned computing resources are being used to process jobs, then additional processing resources, such as VMs, may be provisioned if a high priority job is received. The expected wait time 516 may be an average expected wait time for each job in the queue, an expected wait time for a job at the end of the queue, or an expected wait time for a job at the head of the queue. The expected completion time 518 may be the expected time to complete a most recently added job, the expected time to complete a job at the head of the queue, or a most recently received job.

A node status 520 may indicate a status of multiple nodes, such as, for example, servers 522(1) to 522(Q) (where Q>0), the number of VMs 524 hosted by each of the servers 522, and the number of decommissioned VMs associated with each of the servers 522.

Figure 6:
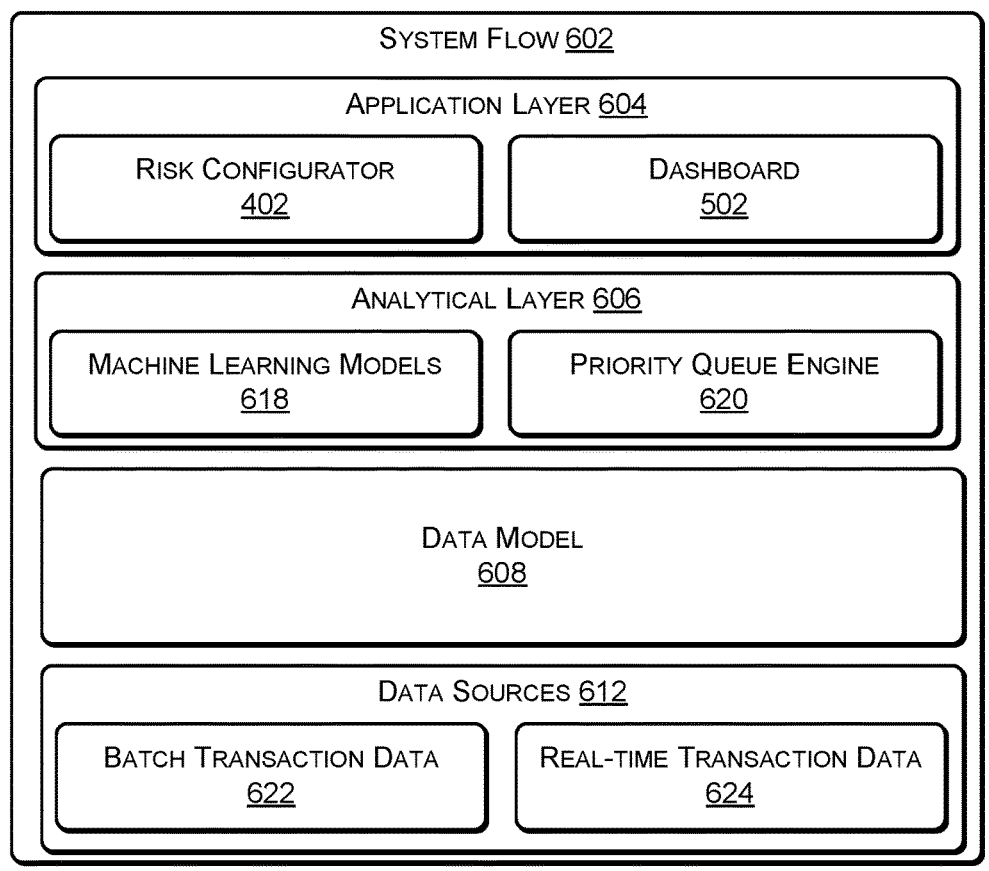
FIG. 6 is a block diagram illustrating a processing architecture according to some examples.

FIG. 6 is a block diagram illustrating a processing architecture 600 according to some examples. A system flow 602 may include an application layer 604, an analytical layer 606, a data model 608, and data sources 612.

The data sources 612 may include batch transaction data 622 and real-time transaction data 624. The data sources 612 may be used to create the data model 608.

The analytical layer 606 may include one or more machine learning models 618 and a priority queue engine 620 that are trained using the data model 608. The machine learning models 618 may be used to determine the risk score associated with a job. The priority queue engine 620 may re-prioritize jobs in the queue each time a job is added to the queue such that jobs are ordered based on the risk score and the priority. For example, a high risk score may indicate a high probability that an SLA violation, adverse revenue impact, or adverse legal impact may occur. A high priority may indicate that if the job is not executed in a timely manner (e.g., within the parameters of the SLA), the client may be significantly impacted. The application layer 604 may include the risk configurator 402 illustrated in FIG. 4 and the dashboard 502 illustrated in FIG. 5.

Figure 7:
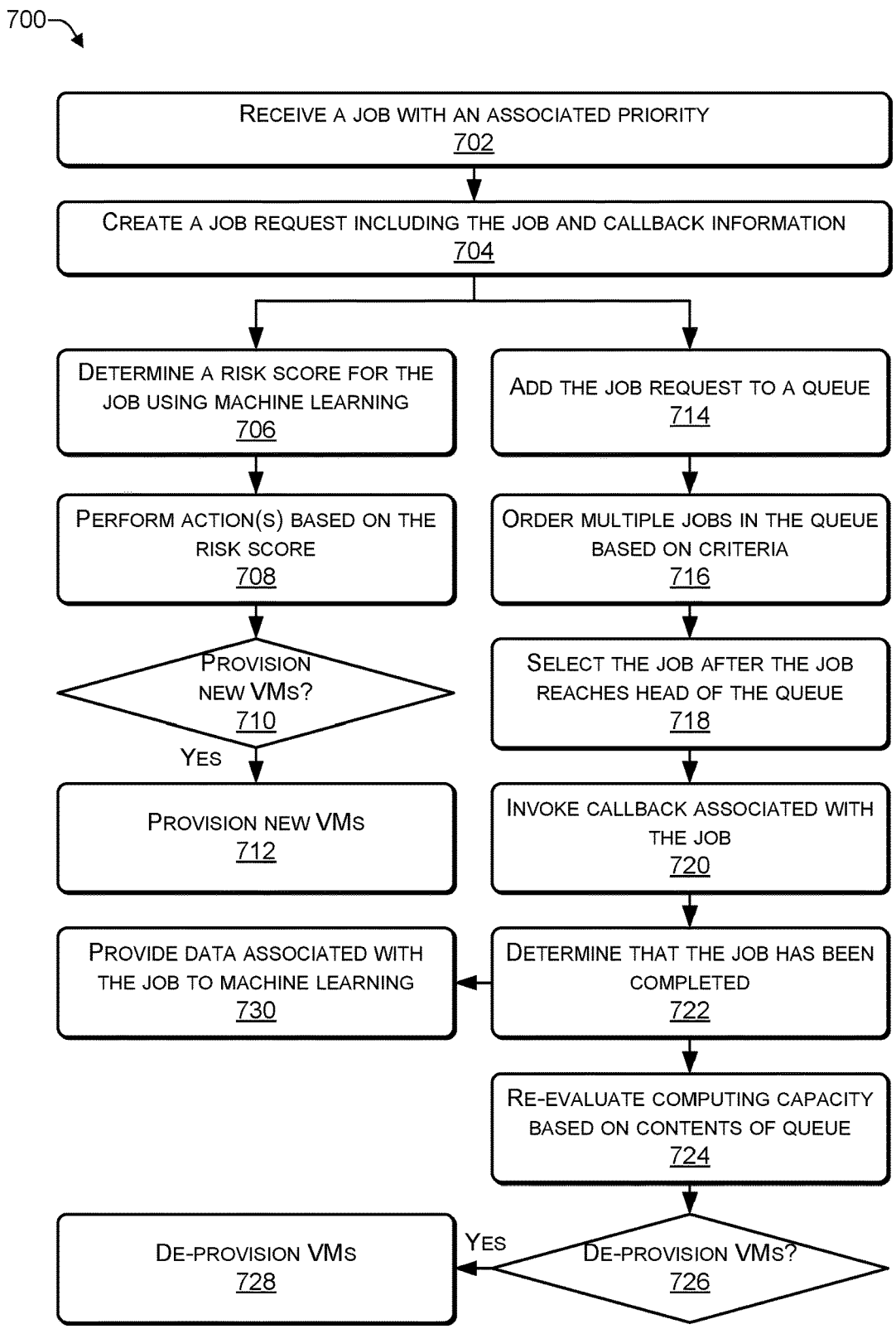
FIG. 7 is a flowchart of a process that includes determining a risk score for a job using machine learning according to some examples.

In the flow diagram of FIG. 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 700 is described with reference to FIGS. 1, 2, 3, 4, 5, and 6 as described above, although other models, frameworks, systems and environments may implement these processes.

FIG. 7 is a flowchart of a process 700 that includes determining a risk score for a job using machine learning according to some examples. The process 700 may be performed by one or more of the components of the architecture 100 of FIG. 1.

At 702, a job with an associated priority may be received (e.g., from a client). At 704, a job request that includes the job and callback information may be created. The process may then proceed to both 706 and 714. For example, in FIG. 1, after the job 144 is received from a client, the application 114 in the cloud host 110 may create the job request 146 that includes the job 144, the SLA 148, the priority 150, and the callback information 152.

At 706, a risk score associated with the job may be determined using a machine learning algorithm (e.g., ordinary least squared or similar). At 708, one or more actions may be performed based on the risk score. At 710, a determination may be made whether to provision new (e.g., additional) VMs. If a determination is made, at 710, that additional VMs are not to be provisioned, then no action with regards to the VMs may be taken. If a determination is made, at 710, that additional VMs are to be provisioned, then additional VMs may be provisioned, at 712. For example, in FIG. 2, the risk score 154 may be determined based on one or more of the factors 202, 204, 206, 208, 210, 212, 214, and 216. The perform action module 128 may perform a set of actions based on which score range the risk score 154 falls into. The actions may include taking no further action, alerting an administrator, executing a particular script, or provisioning additional VMs. For example, if the risk score 154 is high, indicating that the job 144 is predicted to cause an SLA violation, revenue loss, or adverse legal issues, based on the currently provisioned VMs, the current contents of the queue and the effort and priority of the job 144, additional VMs may be provisioned to reduce (e.g., mitigate) the risk.

At 714, the job request may be added to a queue. At 718, the multiple jobs in the queue may be ordered based on one or more criteria. For example, in FIG. 1, the queue scheduler 140 may re-order one or more jobs in the queue 138 based on various criteria, including an effort associated with each job, a priority of each job, and a risk score associated with each job.

At 718, the job may be selected (e.g., for execution) after the job reaches a head of the queue. At 720, the callback information may be used to initiate execution of the job. For example, in FIG. 1, after the job request 146 reaches the head of the queue 138, if the application 114 (or the nodes 116) has sufficient capacity in the cloud host 110, then the callback manager 122 may initiate execution of the job 144. For example, the application 114 within cloud host 110 may have sufficient capacity to execute the job 144 if additional VMs have been provisioned, if a job that was being executed by the application 114 within cloud host 110 has been completed, or both.

At 722, a determination may be made (e.g., confirmation may be received) that the job has been completed. At 724, a computing capacity (e.g., of the currently allocated VMs) may be re-evaluated based on contents of (e.g., jobs currently in) the queue. At 726, a determination may be made whether to de-provision one or VMs. If a determination is made, at 726, that no VMs are to be de-provisioned, then no further action with regard to the VMs may be taken. If a determination is made, at 726, that one or more VMs are to be de-provisioned, then the one or more VMs may be de-provisioned, at 728. At 730, the data associated with executing the job (e.g., execution time, processing resources used, and the like) may be provided to the machine learning algorithm to enable the machine learning algorithm to further refine and improve predictions. For example, in FIG. 1, after the application 114 within cloud host 110 executes the job 144, the application 114 within cloud host 110 may notify the callback manager 122 to register the job as completed. The re-evaluate capacity module 132 may re-evaluate the capacity of the currently allocated VMs against the currently queued jobs to determine if the cloud host 110 has excess capacity. If a determination is made that the cloud host 110 has excess capacity, then one or more VMs may be de-provisioned.

Thus, a client may send a job to a cloud-hosted application (e.g., one of the applications 114 of FIG. 1) for execution. The services 104, 106, 108 of a service provider may determine a risk score using machine learning (e.g., ordinary least squared) to predict the probability (e.g., risk) that revenue loss may occur if the job is not executed within a particular period of time, the probability of an SLA violation, the probability that adverse legal issues may occur, the probability of another potential consequence, or any combination thereof. The risk score may be a weighted score that takes into account one or more risks. For example, the risk score may reflect the consequences of not performing the job within a particular time (e.g., as specified by the SLA), resulting in revenue loss to either the provider of services 104, 106, 108 or the provider of the applications 114 because there may be a monetary penalty for violating the SLA. A particular set of actions may be performed based on the score. For example, multiple numeric ranges may be defined and the set of actions that are performed may depend on which numeric range the calculated risk score 154 lands within. One set of actions may include automatically (e.g., without human interaction) provisioning additional VMs to mitigate the risk and enable the job to be completed without violating the SLA. While the risk score is being determined, the job may be added to a priority queue. When the job reaches the head of the queue, the callback associated with the job may be invoked to execute the job using the associated callback application. After execution of the job is complete, the data associated with the job and with completing the job may be fed back to the machine learning algorithm to improve the predictions made by the machine learning algorithm. In addition, the current capacity of the applications 114 and the nodes 116 may be evaluated based on the jobs that are currently in the queue to determine if the currently provisioned capacity significantly exceeds (e.g., greater than a threshold amount) the amount of processing capacity that the current contents of the queue is estimated to use. If the currently provisioned capacity significantly exceeds what is estimated to be used by currently queued jobs, one or more resources, such as VMs, may be automatically deprovisioned. For example, if 1,500 VMs are provisioned and the currently queued jobs are estimated to use no more than 1,000 VMs, then 500 VMs may be deprovisioned. Thus, the service provider of the services 104, 106, 108 may automatically scale the computing resources, such as VMs. For example, the computing resources, such as VMs, may be automatically scaled up (e.g., to increase resources), based on the risk assessment that is determined each time a new job is received. The computing resources, such as VMs, may be automatically scaled down (e.g., to reduce resources) after a job has been completed, based on re-evaluating the currently allocated resources against the estimated resource usage of currently queued jobs. The process 700 may perform 706, 708, 710, and 712 substantially simultaneously with 714, 716, and 718.

Figure 8:
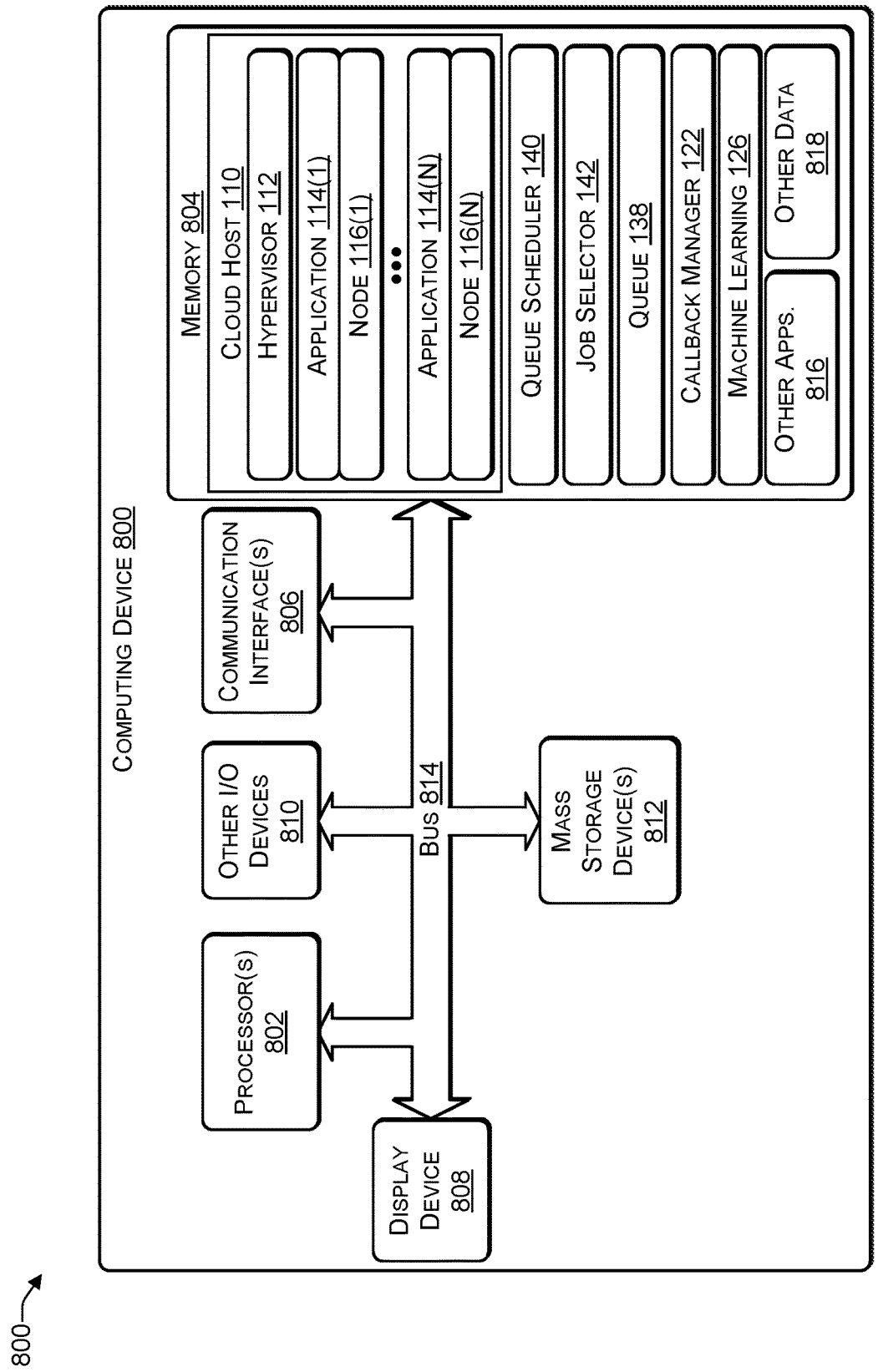
FIG. 8 illustrates an example configuration of a computing device that can be used to implement the systems and techniques described herein.

FIG. 8 illustrates an example configuration of a computing device 800 that can be used to implement the systems and techniques described herein, such as one of the nodes 116 of FIG. 1. The computing device 800 may include one or more processors 802, a memory 804, communication interfaces 806, a display device 808, other input/output (I/O) devices 810, and one or more mass storage devices 812, configured to communicate with each other, such as via a system bus 814 or other suitable connection.

The processor 802 is a hardware device (e.g., an integrated circuit) that may include one or more processing units, at least some of which may include single or multiple computing units or multiple cores. The processor 802 can be implemented as one or more hardware devices, such as microprocessors, microcomputers, microcontrollers, digital signal processors, central processing units, state machines, logic circuitries, and/or any devices that manipulate signals based on executing operational instructions. Among other capabilities, the processor 802 can be configured to fetch and execute computer-readable instructions stored in the memory 804, mass storage devices 812, or other computer-readable media.

Memory 804 and mass storage devices 812 are examples of computer storage media (e.g., memory storage devices) for storing instructions which are executed by the processor 802 to perform the various functions described above. For example, memory 804 may generally include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be a media capable of storing computer-readable, processor-executable program instructions as computer program code that can be executed by the processor 802 as a particular machine configured for carrying out the operations and functions described in the implementations herein.

The computing device 800 may also include one or more communication interfaces 806 for exchanging data with other computing devices. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 806 can also provide communication with external storage (not shown), such as in a storage array, network attached storage, storage area network, or the like.

A display device 808, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, and so forth.

The computer storage media, such as memory 804 and mass storage devices 812, may be used to store software and data. For example, the computer storage media may be used to store portions of the cloud host 110, the queue scheduler 140, the job selector 142, the queue 138, the callback manager 122, the machine learning algorithm 126, other applications 816, and other data 818.

Thus, a cloud-based facility may provide priority-based queue scheduling with resource load prediction using machine learning and auto-provisioning of VMs to manage the excess load, thereby reducing revenue loss and satisfying SLA metrics. Additional VMs may be allocated as the queue becomes occupied with more and more jobs. Distributed applications (multiple instances executing on multiple VMs) may execute the jobs. When an application receives a job, the application may enqueue the job by creating a job request that includes the job priority, relative effort to complete the job, how many VMs are estimated to be used to complete the job, and other related information. After a job is registered, the machine learning algorithm looks at information, such as how many VMs will be used, the number of jobs in the queue, and other factors, and determines if the SLA will be impacted. If the SLA is predicted to be impacted, the Hypervisor of the cloud hosting may be notified to automatically provision additional VMs.

The job is added to the priority queue. When the job reaches the head of the queue, the callback associated with the application is invoked to execute the job. When the job has been completed, the data associated with processing the job, such as the job's priority, the number of VMs used to process the job, the time taken to process the job, etc. may be provided to the machine learning algorithm to enable subsequent allocation of VMs for jobs to be more accurately determined.

The machine learning may use a technique such as ordinary least squares. The job information and priority along with "ambient" information, such as the number of jobs in the queue, relative priority of job relative to other jobs in the queue, the possibility of higher priority jobs being received, the number of currently provisioned VMs, and other information may be used by the machine learning algorithm to determine the risk score. The risk score indicates a probability of the SLA being violated, e.g., what is the probability of a bad event happening and how bad will the impact of the event be if the event does occur. Ordinary least squares indicates what are the chances of an event (e.g., an SLA violation) happening and the customer provided priority indicates the impact of the event. Depending on which range score lands in, take appropriate action.

When a job is added to the queue, the jobs in the queue may be re-ordered. For example, the jobs in the queue may be sorted (e.g., reordered) based on a weighted score of each jobs impact to revenue, SLA, and legal risk. The weights can be adjusted for each customer. For example, legal risk can vary from region to region, such as from state to state or from country to country. The machine learning algorithm learns from past data to determine a queue size threshold that causes revenue impact. Whenever the queue size exceeds the threshold for revenue impact, extra VMs are auto provisioned. When processing a job is complete, a determination may be made whether to de-provision one or more VMs. The process of provisioning VMs and de-provisioning VMs is completely automated, with no manual intervention. After each job is processed, the machine learning algorithm may be retrained in real time to provide continuous learning.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Drawings and described in the Detailed Description, it will be understood that the disclosure is not limited to the examples disclosed, and is capable of numerous rearrangements, modifications and substitutions without departing from the scope of the present disclosure.

What is claimed is:

1. A method comprising: receiving, by a service, a job request, the job request comprising:
a job,
a priority of the job, and
a callback that identifies an application to execute the job;
adding, by the service, the job request to a queue;
determining, by a machine learning algorithm comprising ordinary least squares, a risk score associated with the job, the risk score comprising a probability that completing the job will not satisfy a set of pre-defined constraints, the risk score determined based on a plurality of factors comprising:
the priority associated with the job; and
currently queued jobs in the queue including a number of the currently queued jobs and an individual priority associated with individual jobs in the currently queued jobs;
re-ordering the currently queued jobs in the queue based on a priority associated with each of the currently queued jobs in the queue;
based on determining that the job is at a head of the queue, invoking the callback to call the application to execute the job, wherein the application is hosted by one or more virtual machines of a plurality of virtual machines being executed in a cloud hosting facility; and
based on receiving an indication that the job has been completed:
marking the job as completed;
determining an environment state comprising:
the priority of the job;
an initial place of the job in the queue; and
a number of virtual machines used to execute other jobs ahead of the job in the queue; and
retraining the machine learning algorithm based at least in part on the environment state.

2. The method of claim 1, further comprising:
in response to determining that the risk score is between a first threshold and a second threshold, allocating additional resources;
in response to determining that the risk score is between the second threshold and a third threshold, provisioning additional virtual machines; and
in response to determining that the risk score exceeds the third threshold, sending a notification to an administrator.

3. The method of claim 1, further comprising:
receiving a second job request comprising a second job and a second application;
provisioning one or more additional virtual machines based at least in part on a second risk score associated with the second application; and
after determining that the second application associated with the second job has completed executing the second job, instructing the cloud hosting facility to de-provision at least one virtual machine of the one or more additional virtual machines.

4. The method of claim 1, further comprising:
determining, by the service, that a difference between a capacity of the plurality of virtual machines of the cloud hosting facility and an estimated job effort associated with the currently queued jobs in the queue satisfies a system determined threshold; and
sending a de-provisioning request, by the service, to the cloud hosting facility to de-provision at least one virtual machine of the plurality of virtual machines.

5. The method of claim 1, further comprising:
based on determining that a difference between a capacity of the plurality of virtual machines of the cloud hosting facility and an estimated job effort associated with completing the currently queued jobs in the queue fails to satisfy a system determined threshold, sending a provisioning request to the cloud hosting facility to provision a number of additional virtual machines, the number of additional virtual machines determined at in least in part on the difference.

6. The method of claim 1, wherein:
a the set of pre-defined constraints are specified by a service level agreement associated with the job.

7. The method of claim 1, wherein the plurality of factors further comprise:
an estimated number of resources and virtual machines to complete the currently queued jobs;
one or more date-time related factors;
additional criteria provided by the application in the job request; and
a number of currently provisioned virtual machines.

8. A service to perform operations comprising: receiving a job request comprising:
a job,
a priority of the job, and
a callback that identifies an application to execute the job;
adding the job request to a queue;
determining, using a machine learning algorithm comprising ordinary least squares, a risk score associated with the job, the risk score comprising a probability that completing the job will not satisfy a set of pre-defined constraints, the risk score determined based on a plurality of factors comprising:
the priority associated with the job; and
currently queued jobs in the queue including a number of the currently queued jobs and an individual priority associated with individual jobs in the currently queued jobs;
re-ordering the currently queued jobs in the queue based on a priority associated with each of the currently queued jobs in the queue;
based on determining that the job is at a head of the queue, invoking the callback to call the application to execute the job, wherein the application is hosted by one or more virtual machines of a plurality of virtual machines being executed in a cloud hosting facility; and
based on receiving an indication that the job has been completed:
marking the job as completed;
determining an environment state comprising:
the priority of the job;
an initial place of the job in the queue; and
an amount of virtual machines used to execute other jobs ahead of the job in the queue; and
retraining the machine learning algorithm based at least in part on the environment state.

9. The service of claim 8, the operations further comprising:

in response to determining that the risk score is between a first threshold and a second threshold, allocating additional resources;
in response to determining that the risk score is between the second threshold and a third threshold, provisioning additional virtual machines; and
in response to determining that the risk score exceeds the third threshold, sending a notification to an administrator.

10. The service of claim 8, the operations further comprising:
receiving a second job request comprising a second job and a second application;
provisioning one or more additional virtual machines based at least in part on a second risk score associated with the second application; and
after determining that the second application associated with the second job has completed executing the second job instructing the cloud hosting facility to de-provision at least one virtual machine of the one or more additional virtual machines.

11. The service of claim 8, the operations further comprising:
based on determining that a difference between a capacity of the plurality of virtual machines of the cloud hosting facility and an estimated job effort associated with completing the currently queued jobs in the queue satisfies a predetermined threshold instructing the cloud hosting facility to de-provision at least one virtual machine of the plurality of virtual machines.

12. The service of claim 8, wherein:
a the set of pre-defined constraints are specified by a service level agreement associated with the job, wherein the job request identifies the service level agreement.

13. The service of claim 8, wherein the plurality of factors further comprise:
an estimated number of resources and virtual machines to complete the currently queued jobs;
one or more date-time related factors;
one or more additional factors supplied within the job request; and
a number of currently provisioned virtual machines.

14. One or more non-transitory computer-readable media storing instructions that are executable by one or more processors to perform operations comprising:
receiving, by a service, a job request, the job request comprising:
a job,
a priority of the job, and
a callback that identifies an application to execute the job;
adding, by the service, the job request to a queue;
determining, by a machine learning algorithm comprising ordinary least squares, a risk score associated with the job, the risk score comprising a probability that completing the job will not satisfy a set of pre-defined constraints, the risk score determined based on a plurality of factors comprising:
the priority associated with the job; and
currently queued jobs in the queue including a number of the currently queued jobs and an individual priority associated with individual jobs in the currently queued jobs;
re-ordering the currently queued jobs in the queue based on a priority associated with each of the currently queued jobs in the queue;
based on determining that the job is at a head of the queue, invoking the callback to call the application to execute the job, wherein the application is hosted by one or more virtual machines of a plurality of virtual machines being executed in a cloud hosting facility; and
based on receiving an indication that the job has been completed:
marking the job as completed;
determining an environment state comprising:
the priority of the job;
an initial place of the job in the queue; and
an amount of virtual machines used to execute other jobs ahead of the job in the queue; and
retraining the machine learning algorithm based at least in part on the environment state.

15. The one or more non-transitory computer-readable media of claim 14, the operations further comprising:
in response to determining that the risk score is between a first threshold and a second threshold, allocating additional resources;
in response to determining that the risk score is between the second threshold and a third threshold, provisioning additional virtual machines; and
in response to determining that the risk score exceeds the third threshold, sending a notification to an administrator.

16. The one or more non-transitory computer-readable media of claim 14, the operations further comprising:
receiving a second job request comprising a second job and a second application;
provisioning one or more additional virtual machines based at least in part on a second risk score associated with the second application; and
after determining that the second application has completed executing the second job, instructing the cloud hosting facility to de-provision at least one virtual machine of the one or more additional virtual machines.

17. The one or more non-transitory computer-readable media of claim 14, the operations further comprising:
determining that a difference between a capacity of the plurality of virtual machines of the cloud hosting facility and an estimated job effort associated with completing the currently queued jobs in the queue of the service satisfies a predetermined threshold; and
sending a de-provisioning request to the cloud hosting facility to de-provision at least one virtual machine of the plurality of virtual machines.

18. The one or more non-transitory computer-readable media of claim 14, wherein:
the set of pre-defined constraints are specified by a service level agreement associated with the job.

19. The one or more non-transitory computer-readable media of claim 14, wherein the plurality of factors further comprise:
an estimated number of resources and virtual machines to complete the currently queued jobs;
one or more date-time related factors;
one or more additional factors supplied within the job request; and
a number of currently provisioned virtual machines.

20. The one or more non-transitory computer-readable media of claim 14, the operations further comprising:
re-ordering the currently queued jobs in the queue based at least in part on:
an individual risk score associated with each queued job of the currently queued jobs; and an individual priority associated with each queued job of the currently queued jobs.

* * * * *

UNITED STATES PATENT AND TRADEMARK OFFICE
CERTIFICATE OF CORRECTION

PATENT NO. : 10,783,472 B2
APPLICATION NO. : 15/798645
DATED : September 22, 2020
INVENTOR(S) : Dónal Carpenter and Mahuya Ghosh Page 1 of 1

It is certified that error appears in the above-identified patent and that said Letters Patent is hereby corrected as shown below:

In the Claims

Claim 6, Column 18, Line 21, delete the word "a" before the word "the".

Claim 12, Column 19, Line 32, delete the word "a" before the word "the".

Signed and Sealed this
Twenty-seventh Day of October, 2020

Andrei Iancu
*Director of the United States Patent and Trademark Office*